US011807346B2

(12) United States Patent
Buttles et al.

(10) Patent No.: US 11,807,346 B2
(45) Date of Patent: Nov. 7, 2023

(54) ADVANCED CEMENTITIOUS COMPOSITE FLOATING PLATFORMS AND METHOD OF MANUFACTURE

(71) Applicant: Texas Wind Tower Co., Dallas, TX (US)

(72) Inventors: John Buttles, Los Angeles, CA (US); Jordan Michael Powell, Tyler, TX (US); David Pigram, Sydney (AU)

(73) Assignee: Texas Wind Tower Co., Dallas, TX (US)

( * ) Notice: Subject to any disclaimer, the term of this patent is extended or adjusted under 35 U.S.C. 154(b) by 0 days.

(21) Appl. No.: 18/181,384

(22) Filed: Mar. 9, 2023

(65) Prior Publication Data

US 2023/0286622 A1 Sep. 14, 2023

Related U.S. Application Data

(60) Provisional application No. 63/269,070, filed on Mar. 9, 2022.

(51) Int. Cl.
*B63B 73/50* (2020.01)
*B63B 35/44* (2006.01)
(Continued)

(52) U.S. Cl.
CPC ............... *B63B 73/50* (2020.01); *B63B 5/14* (2013.01); *B63B 35/44* (2013.01); *B63B 73/40* (2020.01); *B63B 2035/446* (2013.01)

(58) Field of Classification Search
CPC B63B 73/50; B63B 35/44; B63B 5/14; B63B 73/40; B63B 2035/446
See application file for complete search history.

(56) References Cited

U.S. PATENT DOCUMENTS 9,518,564 B2 12/2016 Dagher et al.
9,964,097 B2 5/2018 Dagher et al.
(Continued)

FOREIGN PATENT DOCUMENTS

CN 102015435 B 4/2011
KR 20170118709 A 10/2017

OTHER PUBLICATIONS

International Search Report/ Written Opinion issued to PCT/US2023/014914 dated Jul. 7, 2023.

*Primary Examiner* — S. Joseph Morano
*Assistant Examiner* — Jovon E Hayes
(74) *Attorney, Agent, or Firm* — Patterson + Sheridan, LLP

(57) ABSTRACT

Semi-submersible wind turbine platforms capable of floating on a body of water and supporting wind turbines, and a method of manufacturing the semi-submersible wind turbine platforms from advanced cementitious composite material are provided. The method includes determining at a first iteration topological outputs of the wind turbine platform including a plurality of modular sections consisting of an advanced cementitious composite (ACC) material, obtaining a second iteration from the topological outputs, the second iteration including a second model platform and a second model tower of the wind turbine platform, and obtaining addition iterations via simulation to attain a final model platform and a final model tower, the final model platform and the final model tower including a layout of the plurality of modular sections and connections for a platform and a tower of the wind turbine platform.

20 Claims, 7 Drawing Sheets

(51) Int. Cl.
    *B63B 5/14*     (2006.01)
    *B63B 73/40*    (2020.01)

(56) References Cited

U.S. PATENT DOCUMENTS

| | | |
|---|---|---|
| 10,988,909 B1 | 4/2021 | Cotrell |
| 11,014,637 B2 | 5/2021 | Boo et al. |
| 2014/0248091 A1 | 9/2014 | Johnson, Jr. et al. |
| 2020/0317309 A1 | 10/2020 | Hong et al. |
| 2021/0276673 A1 | 9/2021 | Boo et al. |
| 2022/0002961 A1* | 1/2022 | Cotrell .................... B63B 77/10 |

* cited by examiner

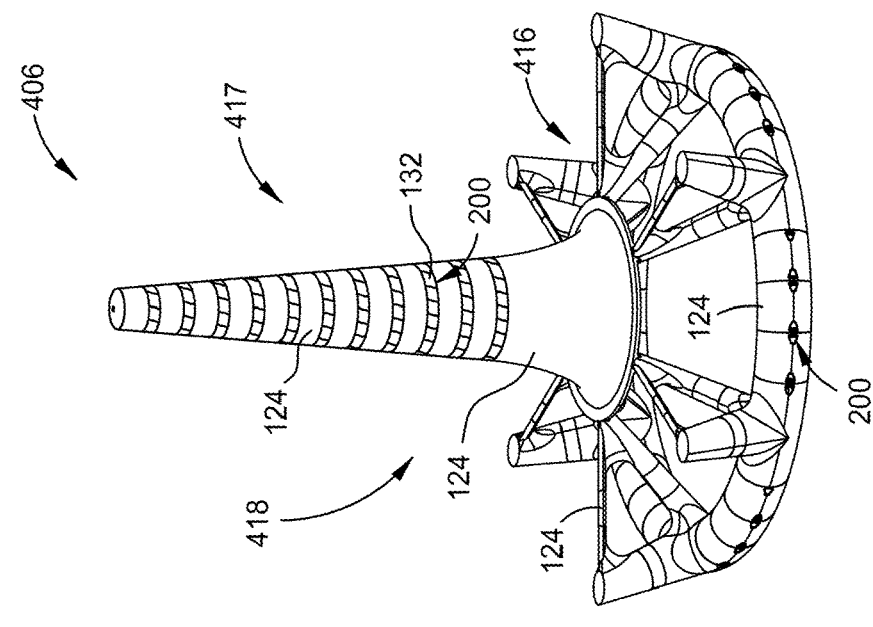
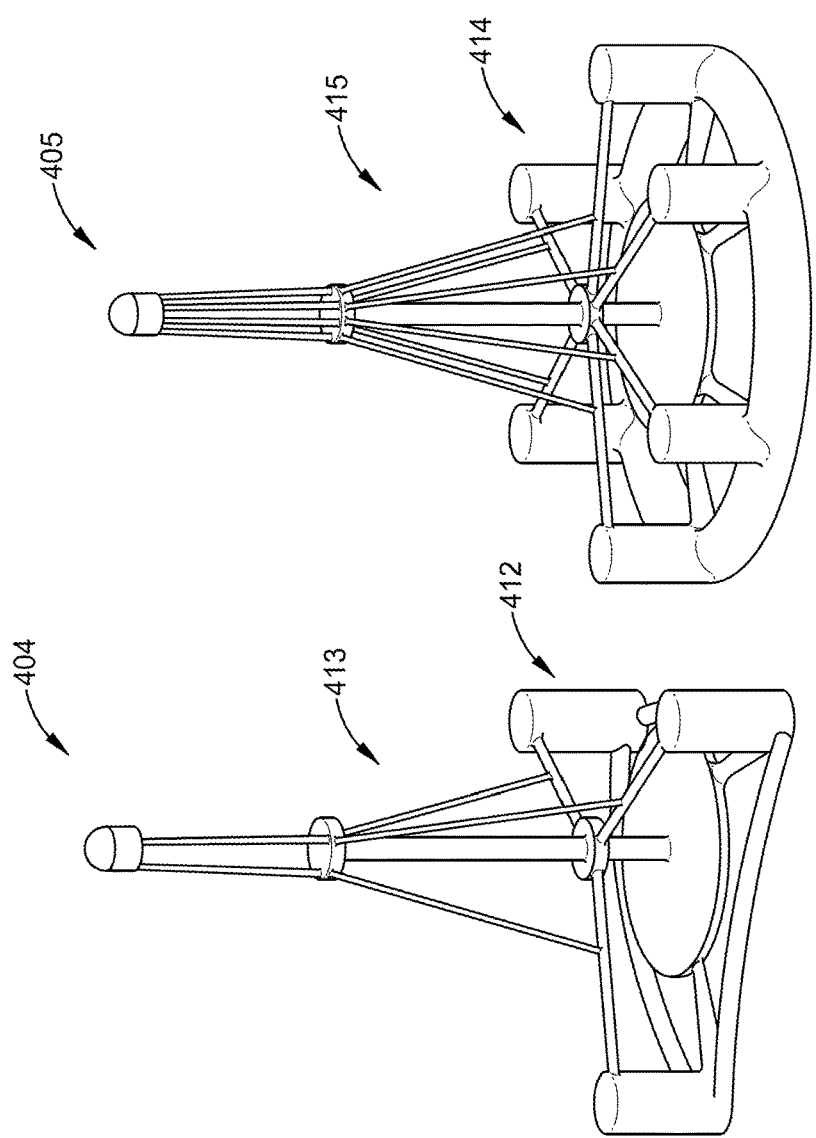
FIG. 4D  FIG. 4E  FIG. 4F

ADVANCED CEMENTITIOUS COMPOSITE FLOATING PLATFORMS AND METHOD OF MANUFACTURE

CROSS-REFERENCE TO RELATED APPLICATIONS

This application claims priority to U.S. Provisional Patent Application Ser. No. 63/269,070, filed on Mar. 9, 2022, which herein is incorporated by reference.

BACKGROUND

Field

Embodiments of the present disclosure generally relate to wind turbine platforms. More specifically, embodiments described herein relate semi-submersible wind turbine platforms capable of floating on a body of water and supporting wind turbines, and a method of manufacturing the semi-submersible wind turbine platforms from advanced cementitious composite material.

Description of the Related Art

It is desirable for groups of wind turbines to be located offshore where the water is over 60 meters deep such that flow of air to the wind turbines is not likely to be disturbed by the presence of various obstacles (i.e., as hills, woods, and buildings) resulting in higher mean wind speeds and more power. Currently, the fixed foundations required to attach wind turbines to the seabed in such deep water are not likely economically feasible. This limitation has led to the development of floating platforms for wind turbines. Accordingly, what is needed in the art are semi-submersible wind turbine platforms capable of floating on a body of water and supporting wind turbines, and a method of manufacturing the semi-submersible wind turbine platforms from advanced cementitious composite material.

SUMMARY

In one embodiment, a method of manufacturing a wind turbine platform is provided. The method includes determining at a first iteration topological outputs of the wind turbine platform including a plurality of modular sections consisting of an advanced cementitious composite (ACC) material. The topological outputs include one or more of a maximum weight, wind load cases, a minimum global stress, a base diameter, a center of gravity, or a mass. The method further includes obtaining a second iteration from the topological outputs, the second iteration including a second model platform and a second model tower of the wind turbine platform, obtaining a third iteration by subjecting the second iteration to simulation, the second iteration including a third model platform and a third model tower of the wind turbine platform, the third model platform and the third model tower include components or component dimensions different than the second model platform and the second model tower, and obtaining addition iterations via simulation to attain a final model platform and a final model tower, the final model platform and the final model tower including a layout of the plurality of modular sections and connections for a platform and a tower of the wind turbine platform.

In another embodiment, a method of manufacturing a wind turbine platform is provided. The method includes determining at a first iteration topological outputs of the wind turbine platform including a plurality of modular sections consisting of an advanced cementitious composite (ACC) material, obtaining a second iteration from the topological outputs, the second iteration including a second model platform and a second model tower of the wind turbine platform, obtaining a third iteration by subjecting the second iteration to simulation, the second iteration including a third model platform and a third model tower of the wind turbine platform, the third model platform and the third model tower include components or component dimensions different than the second model platform and the second model tower, and obtaining addition iterations via simulation to attain a final model platform and a final model tower, the final model platform and the final model tower including a layout of the plurality of modular sections and connections for a platform and a tower of the wind turbine platform, fabricating the modular sections of ACC material, and coupling the modular sections together with the connections according to layout of the final model platform and the final model tower.

In yet another embodiment, a method of manufacturing a wind turbine platform is provided. The method includes determining at a first iteration topological outputs of the wind turbine platform including a plurality of modular sections consisting of an advanced cementitious composite (ACC) material. The topological outputs include one or more of a maximum weight, wind load cases, a minimum global stress, a base diameter, a center of gravity, or a mass. The method further includes obtaining a second iteration from the topological outputs, the second iteration including a second model platform and a second model tower of the wind turbine platform, obtaining a third iteration by subjecting the second iteration to simulation, the second iteration including a third model platform and a third model tower of the wind turbine platform, the third model platform and the third model tower include components or component dimensions different than the second model platform and the second model tower, and obtaining addition iterations via simulation to attain a final model platform and a final model tower, the final model platform and the final model tower including a layout of the plurality of modular sections and connections for a platform and a tower of the wind turbine platform, fabricating the modular sections of ACC material, and coupling the modular sections together with the connections according to layout of the final model platform and the final model tower.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

FIGS. 4A-4F are schematic illustrations view iterations of a design of a semi-submersible wind turbine platform during the method according to embodiments described herein.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to wind turbine platforms. More specifically, embodiments described herein relate to semi-submersible wind turbine platforms capable of floating on a body of water and supporting wind turbines, and a method of manufacturing the semi-submersible wind turbine platforms from advanced cementitious composite material.

Figure 1A:
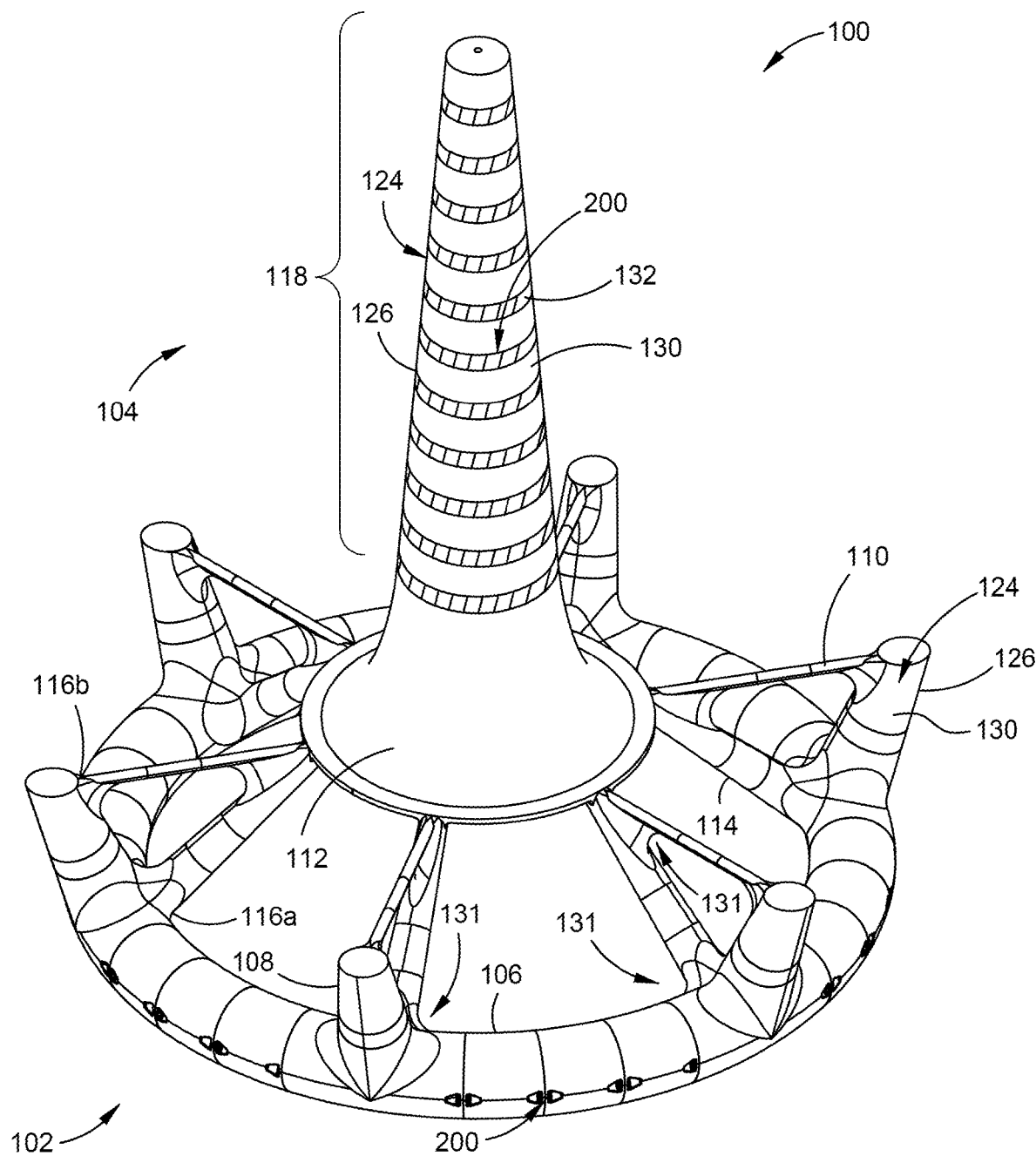
FIG. 1A is a planar view of a semi-submersible wind turbine platform according to embodiments described herein.
Figure 1B:
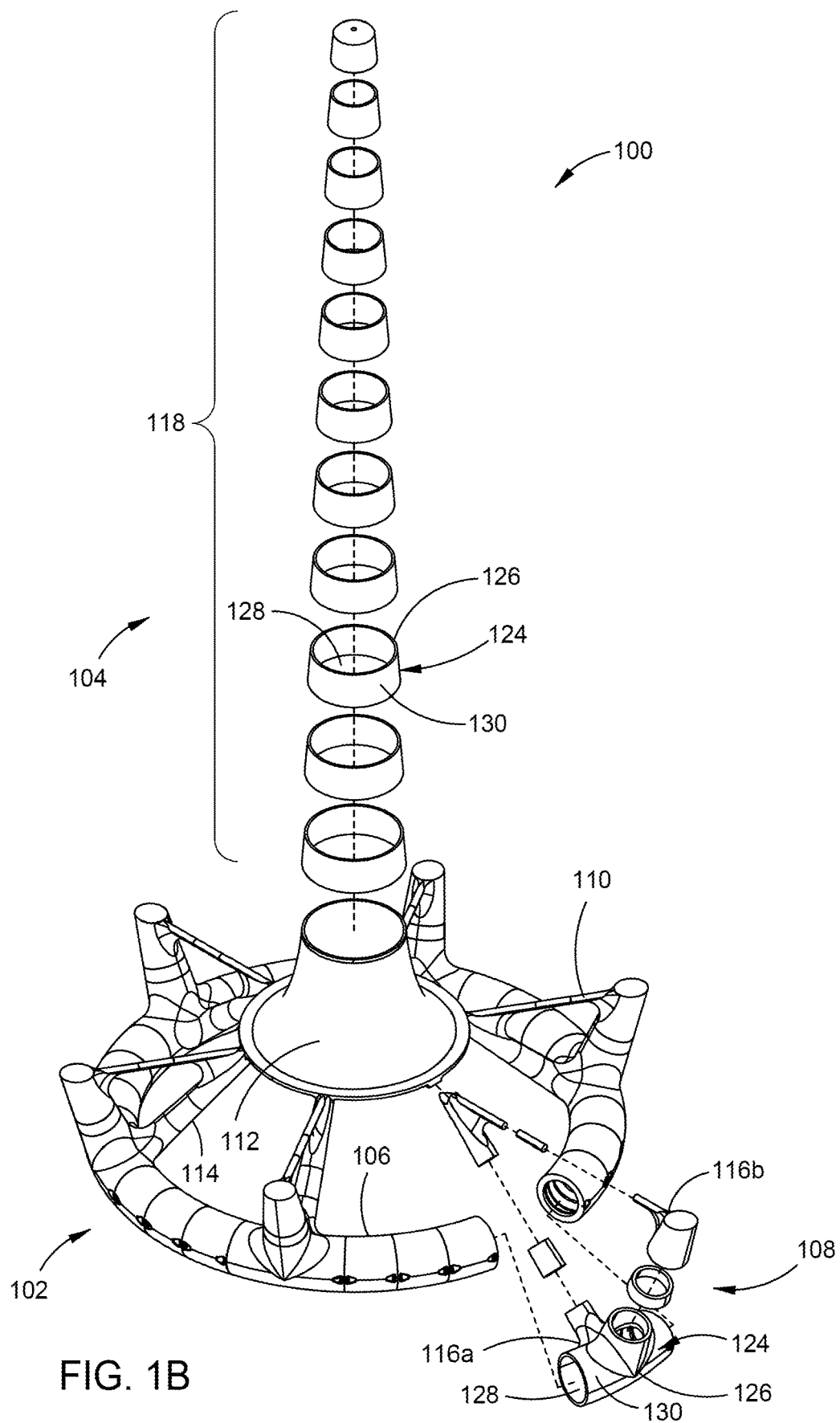
FIG. 1B is an exploded view of a semi-submersible wind turbine platform according to embodiments described herein.
Figure 1C:
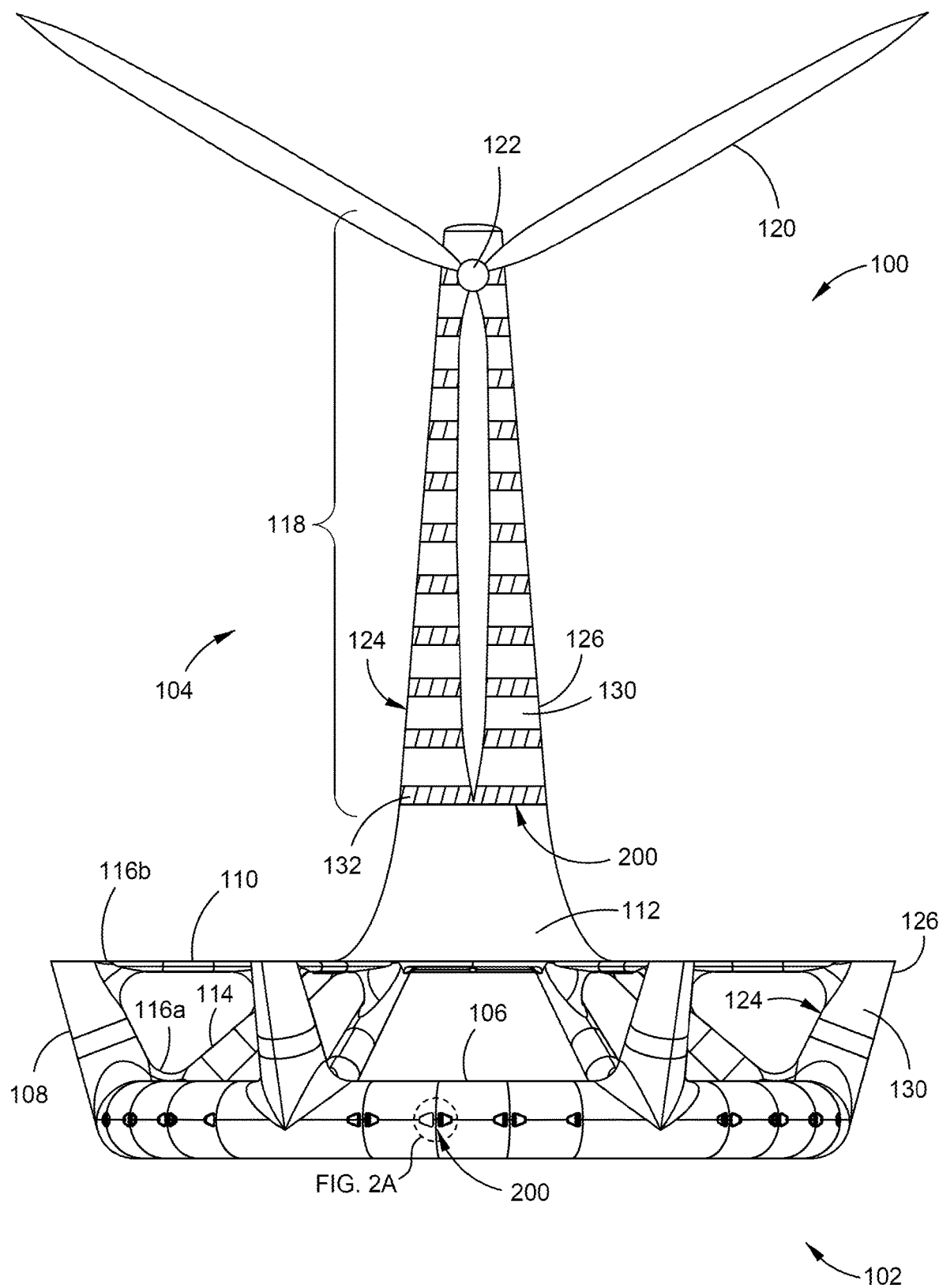
FIG. 1C is a side view of a semi-submersible wind turbine platform according to embodiments described herein.

FIG. 1A is a planar view of a semi-submersible wind turbine platform 100. FIG. 1B is an exploded view of the semi-submersible wind turbine platform 100. FIG. 1C is a side view of the semi-submersible wind turbine platform 100. As described herein, the semi-submersible wind turbine platform 100 is an exemplary semi-submersible wind turbine platform 100 manufactured from the method 300 of manufacturing semi-submersible wind turbine platforms from advanced cementitious composite (ACC) material 130.

The advanced cementitious composite material includes, but is not limited to, fiber-reinforced high-performance concrete (FRHPC), high-performance fiber reinforced cement composite (HPFRCC), macro defect free (MDF) concrete, multi-scale fiber-reinforced concrete (MSFRC), reactive powder concrete (RPC), steel fibrous cement-based composite (SFCBC), ultra-high performance concrete (UHPC), ultra-high performance fiber-reinforced cementitious composite (UHPFRCC), ultra-high performance fiber-reinforced concrete (UHPFRC), ultra-high strength concrete (UHSC), ultra-high strength cement-based composite, ultra-high strength cementitious material, ultra-high strength fiber-reinforced cementitious composite, combinations thereof, or the like. UHPC material is a mixture of Portland cement, silica fume, quartz flour, fine silica sand, superplasticiser, water, and steel or organic fibers. UHPC is characterized by compressive strengths above 150 megapascals (MPa) to 200 MPa, high flexural strengths up to 45 MPa and creep coefficients of 0.2 to 1.0 which are much lower than creep coefficients of normal strength concrete. Other UHPC characteristics are a high modulus of elasticity (above 45 GPa), low capillary porosity, resulting in very low water and gas permeability, and low diffusion of chloride ions, e.g. occurring in seawater.

The design of the semi-submersible wind turbine platform 100 is optimized with the method 300 of manufacturing the semi-submersible wind turbine platforms from ACC material 130. The semi-submersible wind turbine platform 100 includes a platform 102. In one embodiment, the wind turbine platform 100 includes the platform 102 and a tower 104. The platform 102 and the tower 104 are formed from a plurality of modular sections 124 of ACC material 130 that are coupled to each other. The platform 102 corresponds to a final model platform 416 and the tower 104 corresponds to a final model tower 417 further described herein. The final model platform 416 and a final model tower 417 include a layout 418 of a plurality of modular sections 124 and connections 200. The connections 200 may include a fastener 206, as shown in FIG. 2B, or a cable structure 132. The cable structures 132 may be utilized for a pre-stressing process or a post-tensioning process for the fabricating the modular sections 124 or for coupling the modular sections 124 to each other.

The platform 102 includes a base 106 with a plurality of columns 108 connected. The base 106 has a hollow interior space 128 formed by each of the modular sections 124 connected together. The plurality of columns 108 are connected to a support 112 by a plurality of top beams 110. In one embodiment, the platform 102 further includes a plurality of bottom beams 114 connected to the support 112. The plurality of columns 108 are connected to a support 112 by the plurality of top beams 110 and the plurality of bottom beams 114. The plurality of bottom beams 114 are connected to a lower portion 116a of the columns 108. The plurality of top beams 110 are connected to an upper portion 116b of the columns 108. In embodiments including the tower 104, the support 112 is connected to a tower shaft 118. At least one rotor blade 120 is coupled to a hub 122. In one embodiment, as shown in FIG. 1B, the hub 122 is outward from the tower shaft 118. In another embodiment, the hub 122 is coupled on top of the tower shaft 118.

Each modular section 124 includes at least one wall 126 that defines a hollow interior space 128. Each wall 126 is formed from the ACC material 130. The platform 102 and the tower 104 include modular sections 124 are coupled to each other via connections 200. For example, the base 106 and the support 112 include a plurality of modular sections 124 with each of the modular sections 124 connected to each other via one or more connections 200. While one connection between each modular section 124 is shown, multiple connections 200 may be utilized between modular sections 124 according to the layout 418.

As shown in FIGS. 1A-1C, the tower 104 includes 11 modular sections 124. The columns 108 are connected to external modular sections 124 of the base 106. Each of the top beams 110 and the bottom beams 114 include modular sections 124 connected to each other via the connections 200. The base 106 includes a base sections of the plurality of modular sections 124. The columns 108 are connected to external base sections of the base 106. At least one of the top beams 110 and bottom beams 114 include beam section of the plurality of modular sections 124. A first external beam section of the beams is connected to the columns 108 and a second external beam section of the beams is connected to the support 112. The tower shaft 118 has tower sections of the plurality of modular sections 124. An external tower section is connected to the support 112. Cable structures 132 or fasteners 206 may be used interchangeably according to the layout 418 of the plurality of modular sections 124 and the connections 200 for the final model platform 416 and a final model tower 417.

The utilization of the ACC material 130, modularity of the semi-submersible wind turbine platform 100 provided by the plurality of modular sections 124 of ACC material 130, and the method 300 of manufacturing the semi-submersible wind turbine platforms from ACC material 130 provides for semi-submersible wind turbine platforms optimized with longevity, design freedom, form factor freedom, inertness, ductility, high fatigue life, freeze/thaw, reduced maintenance, reduced element size, imperviousness, and portable construction. In some embodiments, connection points 131 between the base 106 and the columns 108, the beams (top beams 110 and bottom beams 114) and the columns 108, and the beams and the support 112 are anticlastic. The anticlastic connection points 131 resulting from the method 300 described herein provide for increased stability and the ability to support greater loads. The semi-submersible wind turbine platform 100 may not require pre-stressing or post-tensioning as a result of the tension control and compression control of the ACC material 130. Hydrogen production elements may be integrated directly into the semi-submersible wind turbine platforms described herein.

The semi-submersible wind turbine platform 100 includes a waterline of about 20 meters (m) to about 40 m from the base 106, a center of gravity of about 15 meters (m) to about 30 m from the base 106, a diameter of the base 106 of about 90 m to about 120 m. a height from the tower 104 of about 100 m to about 200 m. The semi-submersible wind turbine platform 100 has a total mass of about 3,500 tons to about 10,000 tons.

Figure 2A:
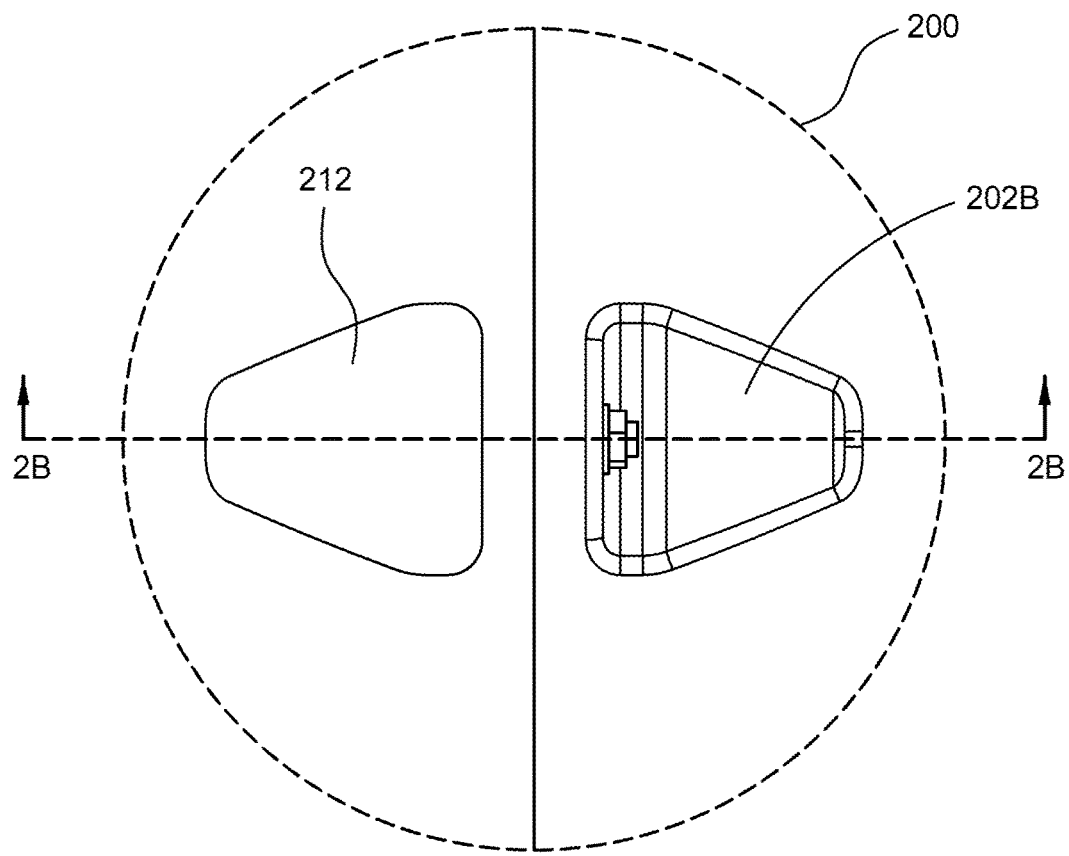
FIG. 2A is a schematic view of a connection according to embodiments described herein.
Figure 2B:
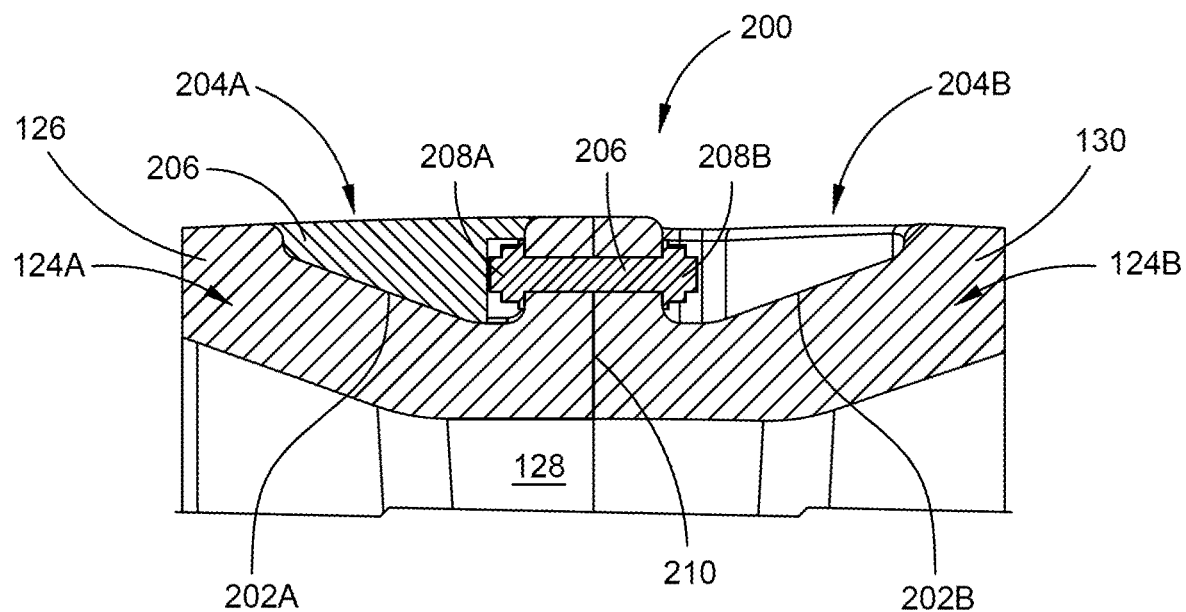
FIG. 2B is a schematic, cross-sectional view of a connection according to embodiments described herein.

FIG. 2A is a schematic view of a connection 200. FIG. 2B is a schematic, cross-sectional view of the connection 200. The connection 200 includes a first recess 202A disposed in wall 126 of a first end 204A of a first section 124A and a second recess 202B disposed in the wall 126 of a second end 204B of a second section 124B. As shown in FIG. 2B, a fastener 206 is disposed through a first flange 208A of the first end 204A and a second flange 208B of the second end 204B. The fastener 206 may include a bolt, a threaded rod, a rivet, a weld, or the like. The first section 124A and the second section 124B may be further sealed by a seal, an O-ring, a gasket, a sealant, or an adhesive between connecting surfaces 210 of the first end 204A and the second end 204B. A cover 214 may be disposed in the first recess 202A and the second recess 202B, whole only one cover 214 in the first recess 202A is shown to assist in the description.

Figure 3:
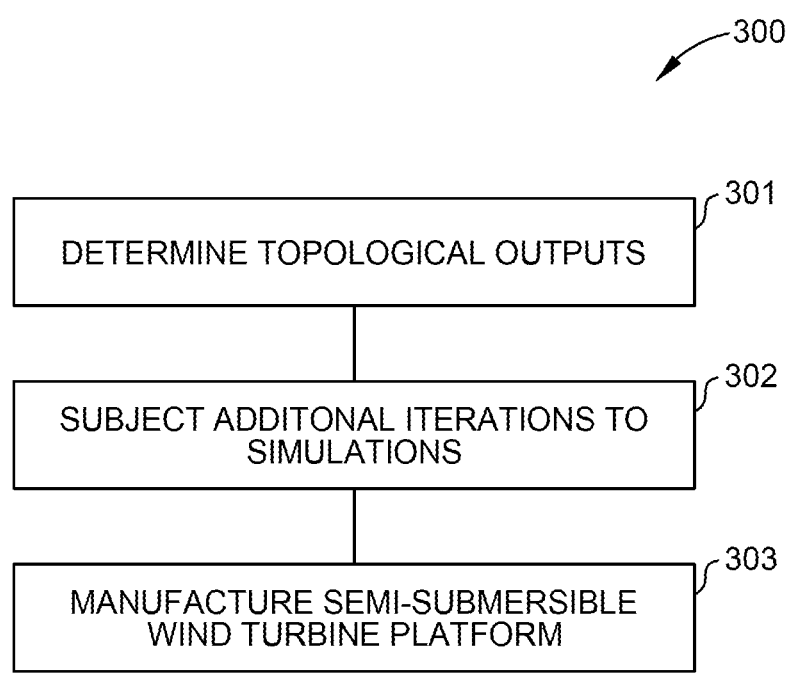
FIG. 3 is a flow diagram of a method of manufacturing semi-submersible wind turbine platforms according to embodiments described herein.
Figure 4C:
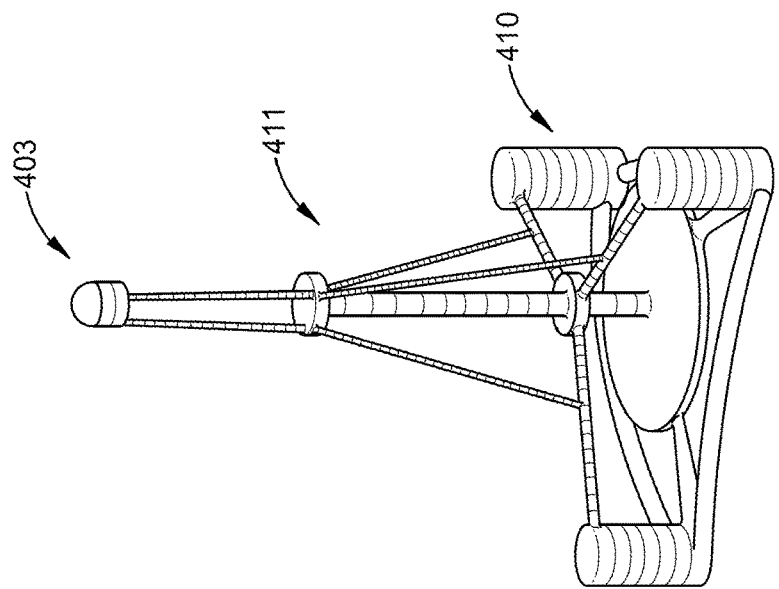

FIG. 3 is a flow diagram of a method 400 of manufacturing semi-submersible wind turbine platforms from ACC material. FIGS. 4A-4F are schematic illustrations view iterations of a design of the semi-submersible wind turbine platform 100. At operation 301, as shown in FIG. 4A of a first iteration 401, topological outputs are determined. Example, topological outputs include a maximum weight, wind load cases, a minimum global stress, a base diameter, a center of gravity, and a mass. At operation 302, additional iterations 402, 403, 404, 405 are subjected to simulations, such as stress simulations. Operation 302 is repeated until a final iteration 406 is obtained that conforms to the topological outputs and meets the simulation standards. Examples of simulation standards include off-shore wind loading and hydrodynamic waving loading.

Figure 4B:
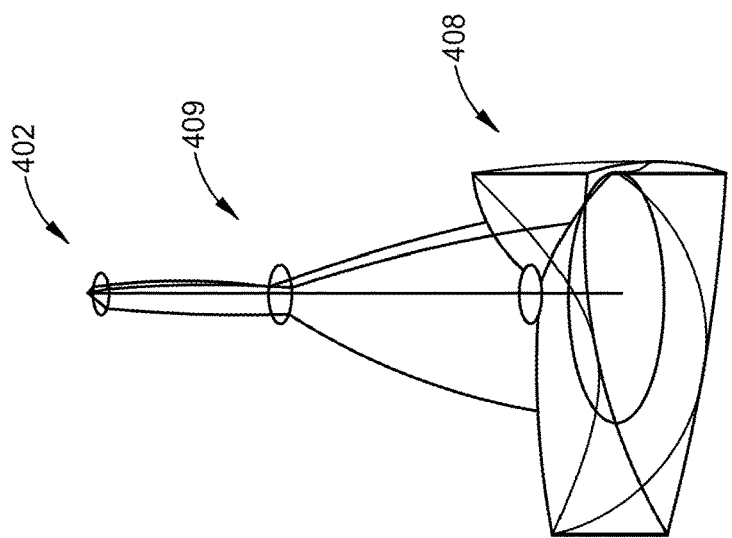
Figure 4A:
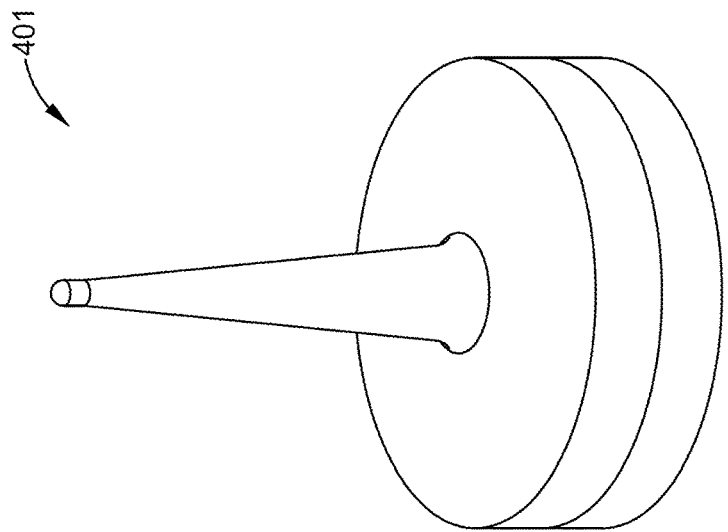

A second iteration 402, as shown in FIG. 4B, includes a second model platform 408 of the platform 102 and a second model tower 409 of the tower 104. The second iteration 303 is subjected to a second simulation to obtain a third iteration 403, as shown in FIG. 4C. The third iteration 403 includes a third model platform 410 of the platform 102 and a third model tower 411 of the tower 104. The third model platform 410 and the third model tower 411 include components and/or component dimensions different than the second model platform 408 and the second model tower 409, respectively, to obtain the final design of the platform 102 and the tower 104 of the semi-submersible wind turbine platform 100. The third iteration 403 is subjected to a third simulation to obtain a fourth iteration 404, as shown in FIG. 4D. The fourth iteration 404 includes a fourth model platform 412 of the platform 102 and a fourth model tower 413 of the tower 104. The fourth model platform 412 and the fourth model tower 413 include components and/or component dimensions different than the third model platform 410 and the third model tower 411, respectively, to obtain the final design of the platform 102 and the tower 104 of the semi-submersible wind turbine platform 100. The fourth iteration 404 is subjected to a fourth simulation to obtain a fifth iteration 405, as shown in FIG. 4E. The fifth iteration 405 includes a fifth model platform 414 of the platform 102 and a fourth model tower 415 of the tower 104. The fifth model platform 414 and the fifth model tower 415 include components and/or component dimensions different than the fourth model platform 412 and the fourth model tower 413, respectively, to obtain the final design of the platform 102 and the tower 104 of the semi-submersible wind turbine platform 100.

The fifth iteration 405 is subjected to a fifth simulation to obtain the final iteration 406, as shown in FIG. 4F. The final iteration 406 corresponds to a design for the semi-submersible wind turbine platform 100. The final iteration 406 includes a final model platform 416 corresponding to the platform 102 and a final model tower 417 corresponding the tower 104 of the semi-submersible wind turbine platform 100, as shown in of FIGS. 1A-1C and described herein. The final iteration 406 further includes the modular sections 124 of the platform 102 and the tower 104. The final model platform 416 and the final model tower 417 including a layout 418 of the plurality of modular sections 124 and connections for the platform 102 and the tower 104. The modularity of the semi-submersible wind turbine platform 100 provided by the plurality of modular sections 124 allows iterative fabrication of the wind turbine platform 100.

At operation 203, the semi-submersible wind turbine platform 100 is manufactured from ACC material 130. First, the modular sections 124 of ACC material 130 are fabricated. The fabricating the modular sections 124 utilizes cable net structures, false works, free-form structures, form-works, membranes, or combinations thereof to guide the deposition of the ACC material according to the final model platform 416 and the final model tower 417. The free-form structures, form-works or the like may be 3D-printed. In another embodiment, which can be combined with other embodiments described herein, the ACC material is 3D-printed. When the ACC material is 3D-printed cable net structures, false works, free-form structures, form-works, membranes, or combinations thereof may be utilized. Second, the modular sections 124 are coupled together with the connections 200 according to layout 418 of the final model platform 416 and the final model tower 417.

In summation, semi-submersible wind turbine platforms capable of floating on a body of water and supporting wind turbines, and a method of manufacturing the semi-submersible wind turbine platforms from ACC material are described herein. The utilization of method described herein provides for cost-effective fabrication of semisubmersible wind turbine platforms usable at locations offshore with depths greater than 60 meters resulting from iterative design and ACC material.

While the foregoing is directed to examples of the present disclosure, other and further examples of the disclosure may be devised without departing from the basic scope thereof, and the scope thereof is determined by the claims that follow.

What is claimed is:

1. A method of manufacturing a wind turbine platform, comprising:

determining at a first iteration topological outputs of the wind turbine platform including a plurality of modular sections consisting of an advanced cementitious composite (ACC) material, the topological outputs including one or more of a maximum weight, wind load cases, a minimum global stress, a base diameter, a center of gravity, or a mass;

obtaining a second iteration from the topological outputs, the second iteration including a second model platform and a second model tower of the wind turbine platform;

obtaining a third iteration by subjecting the second iteration to simulation, the second iteration including a third model platform and a third model tower of the wind turbine platform, the third model platform and the third model tower include components or component dimensions different than the second model platform and the second model tower; and obtaining addition iterations via simulation to attain a final model platform and a final model tower, the final model platform and the final model tower including a layout of the plurality of modular sections and connections for a platform and a tower of the wind turbine platform.

2. The method of claim 1, further comprising:
fabricating the modular sections of ACC material; and
coupling the modular sections together with the connections according to the layout of the final model platform and the final model tower.

3. The method of claim 2, wherein the platform comprises:

a base comprising a base sections of the plurality of modular sections;

columns connected to external base sections of the base; and a support connected to the columns via beams, wherein a first external beam section is connected to the columns and a second external beam section of the beams is connected to the support.

4. The method of claim 3, wherein the platform further comprises a tower shaft, the tower shaft has tower sections of the plurality of modular sections, an external tower section is connected to the support.

5. The method of claim 4, where at least one rotor blade is coupled to a hub, the hub is outward from the tower shaft or coupled on top of the tower shaft.

6. The method of claim 3, wherein the base has a hollow interior space formed by each of the modular sections connected together.

7. The method of claim 3, wherein connection points between the base and the columns, the beams and the columns, and the beams and the support are anticlastic.

8. The method of claim 2, wherein the connections comprise a fastener or a cable structure.

9. The method of claim 8, wherein cable structures are utilized for a pre-stressing process or a post-tensioning process for the fabricating the modular sections or for the coupling the modular sections.

10. The method of claim 8, wherein the fastener comprises a bolt, a threaded rod, a rivet, or a weld.

11. The method of claim 2, wherein the fabricating the modular sections comprises utilizing false works, free-form structures, form-works, membranes, or combinations thereof to guide deposition of the ACC material.

12. The method of claim 1, wherein the ACC material includes fiber-reinforced high-performance concrete (FRHPC), high-performance fiber reinforced cement composite (HPFRCC), macro defect free (MDF) concrete, multi-scale fiber-reinforced concrete (MSFRC), reactive powder concrete (RPC), steel fibrous cement-based composite (SFCBC), ultra-high performance concrete (UHPC), ultra-high performance fiber-reinforced cementitious composite (UHPFRCC), ultra-high performance fiber-reinforced concrete (UHPFRC), ultra-high strength concrete (UHSC), ultra-high strength cement-based composite, ultra-high strength cementitious material, ultra-high strength fiber-reinforced cementitious composite, or combinations thereof.

13. A method of manufacturing a wind turbine platform, comprising:

determining at a first iteration topological outputs of the wind turbine platform including a plurality of modular sections consisting of an advanced cementitious composite (ACC) material;

obtaining a second iteration from the topological outputs, the second iteration including a second model platform and a second model tower of the wind turbine platform;

obtaining a third iteration by subjecting the second iteration to simulation, the second iteration including a third model platform and a third model tower of the wind turbine platform, the third model platform and the third model tower include components or component dimensions different than the second model platform and the second model tower;

obtaining addition iterations via simulation to attain a final model platform and a final model tower, the final model platform and the final model tower including a layout of the plurality of modular sections and connections for a platform and a tower of the wind turbine platform;

fabricating the modular sections of ACC material; and
coupling the modular sections together with the connections according to layout of the final model platform and the final model tower.

14. The method of claim 13, wherein the platform comprises:

a base comprising a base sections of the plurality of modular sections;

columns connected to external base sections of the base; and a support connected to the columns via beams, wherein a first external beam section is connected to the columns and a second external beam section of the beams is connected to the support.

15. The method of claim 14, wherein connection points between the base and the columns, the beams and the columns, and the beams and the support are anticlastic.

16. The method of claim 13, wherein the connections comprise a fastener or a cable structure.

17. The method of claim 16, wherein cable structures are utilized for a pre-stressing process or a post-tensioning process for the fabricating the modular sections or for the coupling the modular sections.

18. The method of claim 13, wherein the fabricating the modular sections comprises utilizing false works, free-form structures, form-works, membranes, or combinations thereof to guide deposition of the ACC material.

19. The method of claim 13, wherein the ACC material includes fiber-reinforced high-performance concrete (FRHPC), high-performance fiber reinforced cement composite (HPFRCC), macro defect free (MDF) concrete, multi-scale fiber-reinforced concrete (MSFRC), reactive powder concrete (RPC), steel fibrous cement-based composite (SFCBC), ultra-high performance concrete (UHPC), ultra-high performance fiber-reinforced cementitious composite (UHPFRCC), ultra-high performance fiber-reinforced concrete (UHPFRC), ultra-high strength concrete (UHSC), ultra-high strength cement-based composite, ultra-high strength cementitious material, ultra-high strength fiber-reinforced cementitious composite, or combinations thereof.

20. A method of manufacturing a wind turbine platform, comprising:

determining at a first iteration topological outputs of the wind turbine platform including a plurality of modular sections consisting of an advanced cementitious composite (ACC) material, the topological outputs including one or more of a maximum weight, wind load cases, a minimum global stress, a base diameter, a center of gravity, or a mass;

obtaining a second iteration from the topological outputs, the second iteration including a second model platform and a second model tower of the wind turbine platform;

obtaining a third iteration by subjecting the second iteration to simulation, the second iteration including a third model platform and a third model tower of the wind turbine platform, the third model platform and the third model tower include components or component dimensions different than the second model platform and the second model tower;

obtaining addition iterations via simulation to attain a final model platform and a final model tower, the final model platform and the final model tower including a layout of the plurality of modular sections and connections for a platform and a tower of the wind turbine platform;

fabricating the modular sections of ACC material; and coupling the modular sections together with the connections according to layout of the final model platform and the final model tower.

\* \* \* \* \*